(12) United States Patent
Herman et al.

(10) Patent No.: US 10,891,801 B2
(45) Date of Patent: Jan. 12, 2021

(54) METHOD AND SYSTEM FOR GENERATING A USER-CUSTOMIZED COMPUTER-GENERATED ANIMATION

(71) Applicant: DreamWorks Animation LLC, Glendale, CA (US)

(72) Inventors: Brad Kenneth Herman, Culver City, CA (US); Shiraz Akmal, Glendale, CA (US)

(73) Assignee: DreamWorks Animation L.L.C., Universal City, CA (US)

( * ) Notice: Subject to any disclaimer, the term of this patent is extended or adjusted under 35 U.S.C. 154(b) by 358 days.

(21) Appl. No.: 14/735,960

(22) Filed: Jun. 10, 2015

(65) Prior Publication Data
US 2016/0364896 A1    Dec. 15, 2016

(51) Int. Cl.
*G06T 19/20* (2011.01)
*G06T 13/20* (2011.01)
*G06T 13/80* (2011.01)

(52) U.S. Cl.
CPC .............. *G06T 19/20* (2013.01); *G06T 13/20* (2013.01); *G06T 13/80* (2013.01); *G06T 2213/08* (2013.01); *G06T 2219/2021* (2013.01)

(58) Field of Classification Search
CPC combination set(s) only.
See application file for complete search history.

(56) References Cited

U.S. PATENT DOCUMENTS

| | | | |
|---|---|---|---|
| 7,046,732 B1* | 5/2006 | Slowe | H04N 19/20 347/154 |
| 2003/0051255 A1* | 3/2003 | Bulman et al. | 725/135 |
| 2007/0257920 A1* | 11/2007 | Neider | G06Q 30/02 345/473 |
| 2009/0143881 A1 | 6/2009 | Smyers | |
| 2011/0064388 A1 | 3/2011 | Brown et al. | |
| 2013/0326377 A1 | 12/2013 | Yu et al. | |
| 2015/0254903 A1* | 9/2015 | Sumner | G06T 19/006 345/420 |

OTHER PUBLICATIONS

Adrian Clark, Andreas Dunser, "An Interactive Augmented Reality Coloring Book", Mar. 5, 2012, IEEE, IEEE Symposium on 3D User Interfaces 2012, pp. 7-10.*

(Continued)

*Primary Examiner* — Robert Bader
(74) *Attorney, Agent, or Firm* — Dentons US LLP

(57) ABSTRACT

A method for generating a user-customized computer-generated animation includes receiving digital content and determining a modifiable portion of the digital content. The digital content includes a computer-generated animation. A design template is received, where the design template includes a representation of the modifiable portion of the digital content. Template image data is generated by performing image analysis on the representation of the modifiable portion of the digital content. A revised portion of the digital content is generated based on the template image data, where the revised portion is a revised version of the modifiable portion of the digital content. Updated digital content that includes a version of the computer-generated animation with the revised portion of the digital content is generated and displayed.

25 Claims, 6 Drawing Sheets
(4 of 6 Drawing Sheet(s) Filed in Color)

(56) References Cited

OTHER PUBLICATIONS

Anuruddha Hettiarachchi, Suranga Nanayakkara, Kian Peen Yeo, Roy Shilkrot, Pattie Maes, "FingerDraw: More than a Digital Paintbrush", Mar. 8, 2013, ACM, Proceedings of the 4th Augmented Human International Conference, pp. 1-4.*

Extended European Search Report received for European Patent Application No. 16173932.1, dated Oct. 11, 2016, 8 pages.

* cited by examiner

300

310

METHOD AND SYSTEM FOR GENERATING A USER-CUSTOMIZED COMPUTER-GENERATED ANIMATION

BACKGROUND

1. Field

This application relates generally to user generated content and, more specifically, to systems and methods for generating a user-customized version of pre-existing content, such as a computer-generated animation or video footage.

2. Description of the Related Art

Computer animation is the process of generating animated images using computer graphics. FIG. 1 depicts an example of a computer-generated image. A computer-generated scene may include a virtual environment including various objects (e.g., trees, rocks, clouds, etc.) and characters (e.g., animals, people, etc.). Models of characters, for example, may be created and then moved or deformed to simulate motion. Images of the scene are rendered at selected times or frames to create an animated video.

Current techniques allow a user to control certain visual aspects in interactive computer graphic environments. For example, in current video games, a user may choose certain visual characteristics of a controllable character (e.g., the color of a character's hair, skin, or clothing). However, users are often restricted to select from a number of predetermined characteristics (e.g., colors, styles, etc.). Existing techniques also do not provide the ability to customize content that has previously been created, such as an existing animated movie, show, or the like.

SUMMARY

The following describes techniques for generating a user-customized version of pre-existing digital content, such as a computer-generated animation or live action video footage.

In some embodiments, a method for generating a user-customized computer-generated animation includes receiving digital content and determining a modifiable portion of the digital content. The digital content includes a computer-generated animation. A modifiable portion of the digital content is determined and a design template including a representation of the modifiable portion of the digital content is received. Template image data is generated by performing image analysis on the representation of the modifiable portion of the digital content. A revised portion of the digital content is generated based on the template image data, where the revised portion is a revised version of the modifiable portion of the digital content. Updated digital content including a version of the computer-generated animation with the revised portion of the digital content is generated and caused to be displayed.

In some embodiments, before receiving the design template, the design template is provided for editing, and an edited version of the provided design template is received. In some embodiments, providing the design template includes providing a user interface including the design template. Optionally, data representing a user input on the user interface is received and the design template is edited in accordance with the user input.

In some embodiments, generating the template image data includes determining a color profile of the representation of the modifiable portion of the digital content. In some embodiments, generating the revised portion of the digital content includes determining a color profile of the revised portion based on the color profile of the representation of the modifiable portion. In some embodiments, generating the revised portion of the digital content comprises rendering the revised portion based on the color profile of the representation of the modifiable portion of the digital content.

In some embodiments, generating the updated digital content comprises mapping the revised version onto the modifiable portion of the digital content. In some embodiments, generating the updated digital content comprises rendering the digital content using the revised portion. In some embodiments, a version of the digital content without the modifiable portion is generated, and the revised portion is overlaid on the version of the digital content without the modifiable portion.

DESCRIPTION OF THE FIGURES

The patent or application file contains at least one drawing executed in color. Copies of this patent or patent application publication with color drawings will be provided by the Office upon request and payment of the necessary fee.

The embodiments depicted in the figures are only exemplary. One skilled in the art will readily recognize from the following discussion that alternative embodiments of the structures and methods illustrated herein can be employed without departing from the principles described herein.

DETAILED DESCRIPTION

The following description sets forth specific configurations, parameters, and the like. It should be recognized, however, that such description is not intended to limit the present disclosure but is instead provided as a description of exemplary embodiments.

Figure 1:
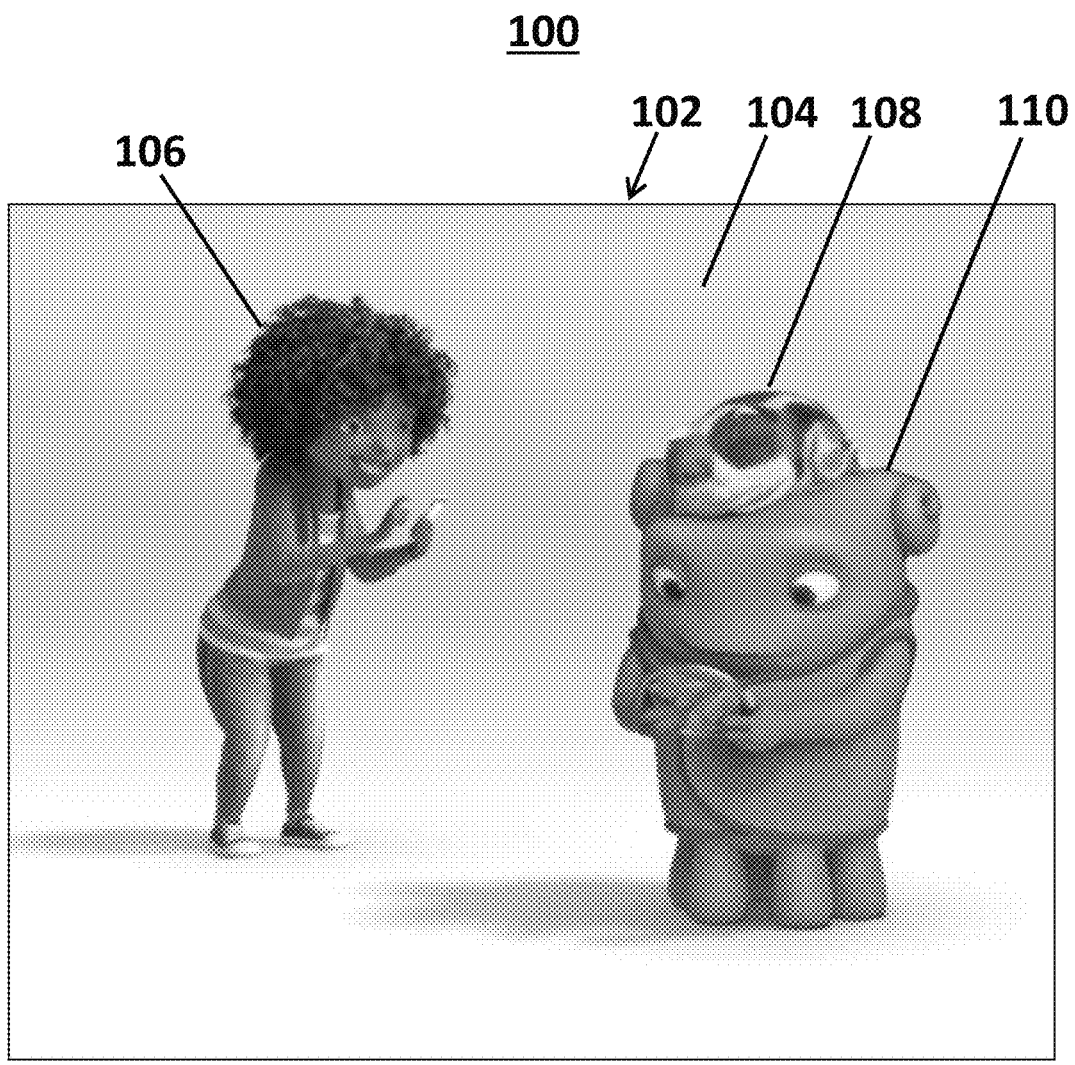
FIG. 1 depicts an exemplary embodiment of digital content in accordance with some embodiments.

FIG. 1 depicts an example of digital content 100 including image 102. Image 102 is a computer-generated image including background 104, a girl 106, an animal 108, and a fictional character 110. In the illustrated embodiment, digital content 100 is a computer-generated animation, of which image 102 is a single frame. It should be recognized, however, that in some embodiments, digital content 100 can include, at least in part, other types of content (e.g., live action video footage or non-computer-generated content) and can comprise a stand-alone image or a plurality of images (e.g., a video).

Digital content 100 includes at least a portion that can be modified. This portion may be referred to as a modifiable portion. In some embodiments, the modifiable portion may be referred to as a user editable portion or color enabled portion for reasons that will be made clear below. Any portion of digital content 100 can be determined to be a modifiable portion. In the present example, the modifiable portion of digital content 100 includes the portion occupied by fictional character 110 depicted in image 102. In some embodiments, the modifiable portion includes part of background 104, girl 106, or animal 108. The modifiable portion may be included in some or all of the images comprised in digital content 100 (e.g., one or more frames of a computer-generated animation or live action video footage).

Figure 2A:
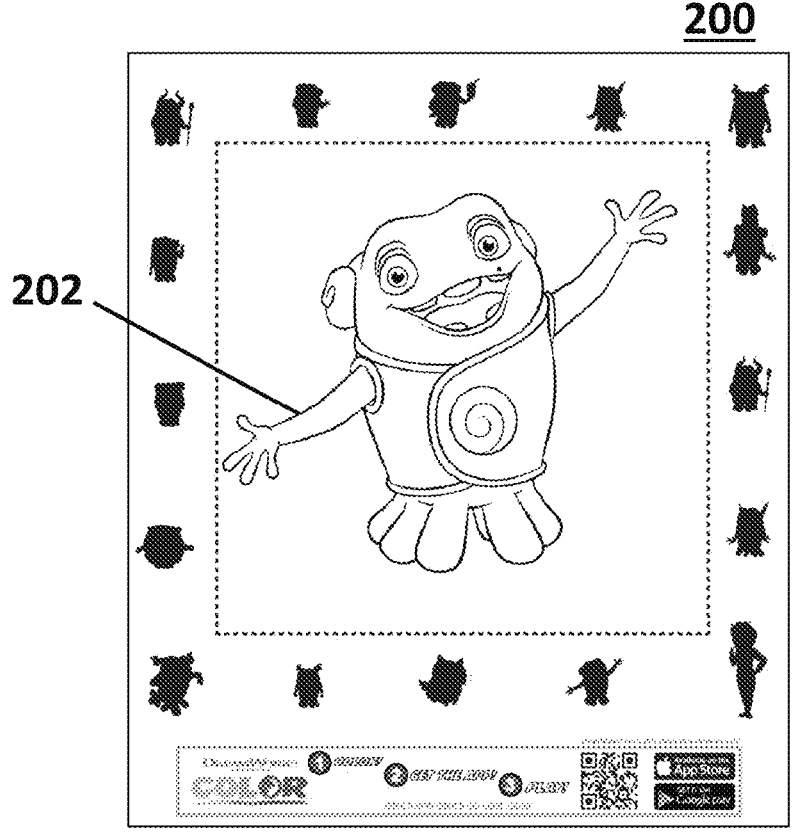
FIG. 2A depicts an exemplary design template in accordance with some embodiments.

FIG. 2A depicts an example of an editable design template 200 including a representation 202 of the modifiable portion of digital content 100. More particularly, design template 200 includes a representation 202 of fictional character 110. In FIG. 2A, representation 202 is a blank line drawing of fictional character 110 colored all white, without any shading, texture, or the like. In some embodiments, representation 202 is uniformly colored in a color other than white or is partially colored (e.g., only some portions may be left blank to indicate that only the blank portions are available for editing). In FIG. 2A, the background space around representation 202 is also white. In some embodiments, the background is a different color or style than representation 202.

Figure 2B:
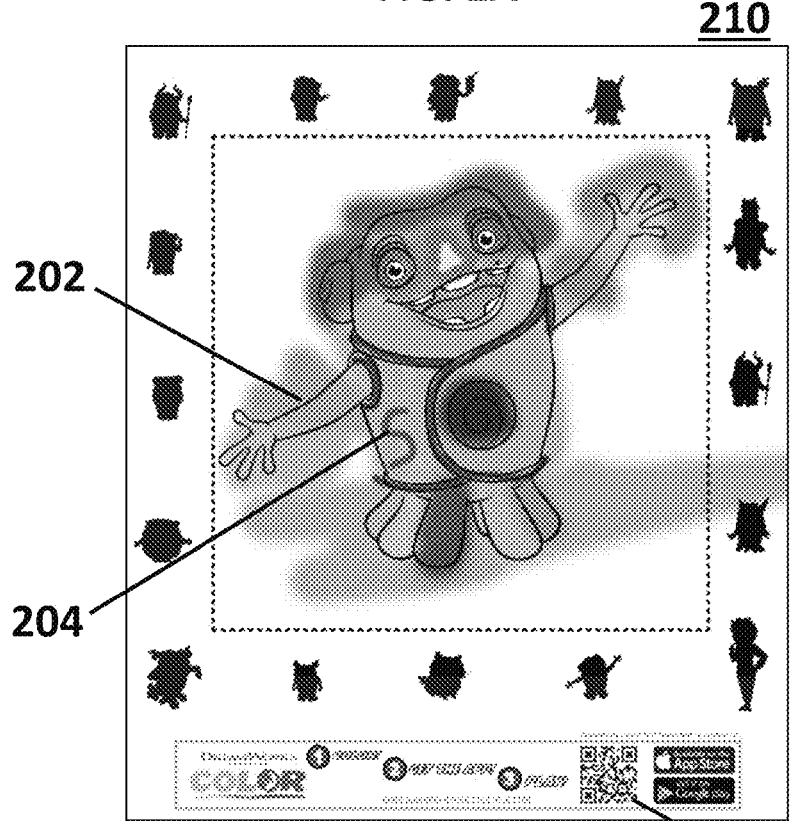
FIG. 2B depicts an edited design template in accordance with some embodiments.

FIG. 2B depicts an example of an edited version 210 of design template 200. In some embodiments, design template 200 can be edited by, for example, adding colors or features to portions of design template 200 or changing the color of portions of design template 200. In FIG. 2B, different colors have been added to various portions of representation 202, and a green S-shaped symbol 204 has been added at a location corresponding to the vest worn by character 110.

Figure 3A:
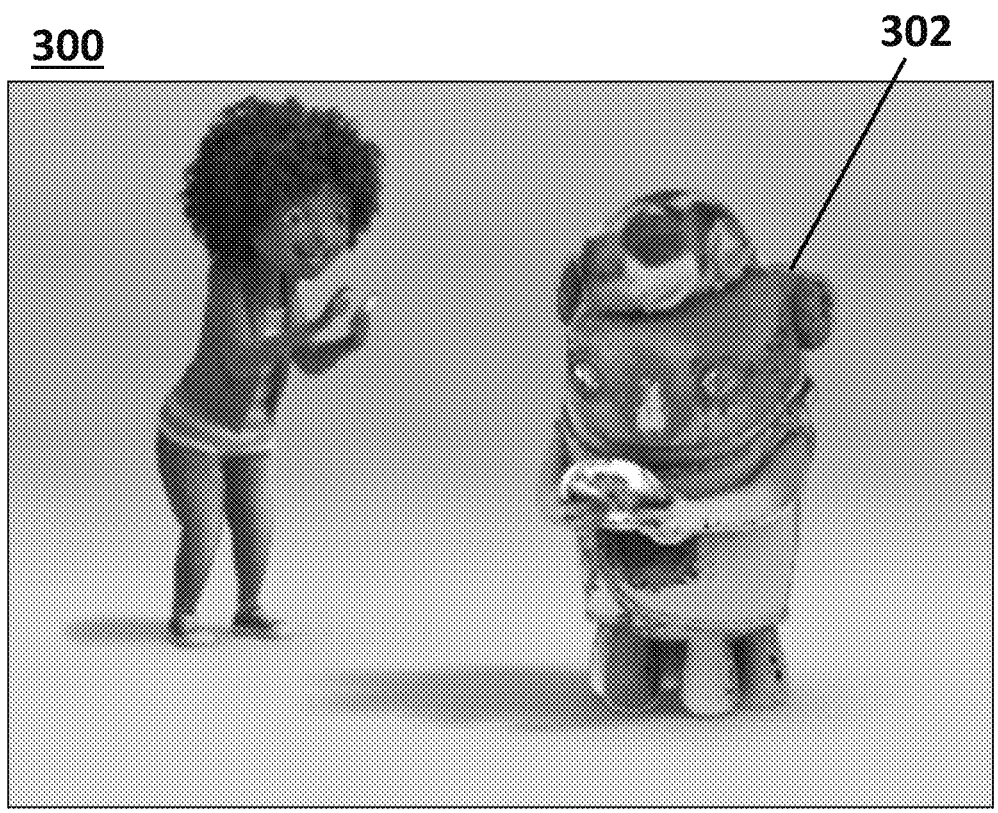
FIG. 3A depicts an exemplary image of revised digital content in accordance with some embodiments.
Figure 3B:
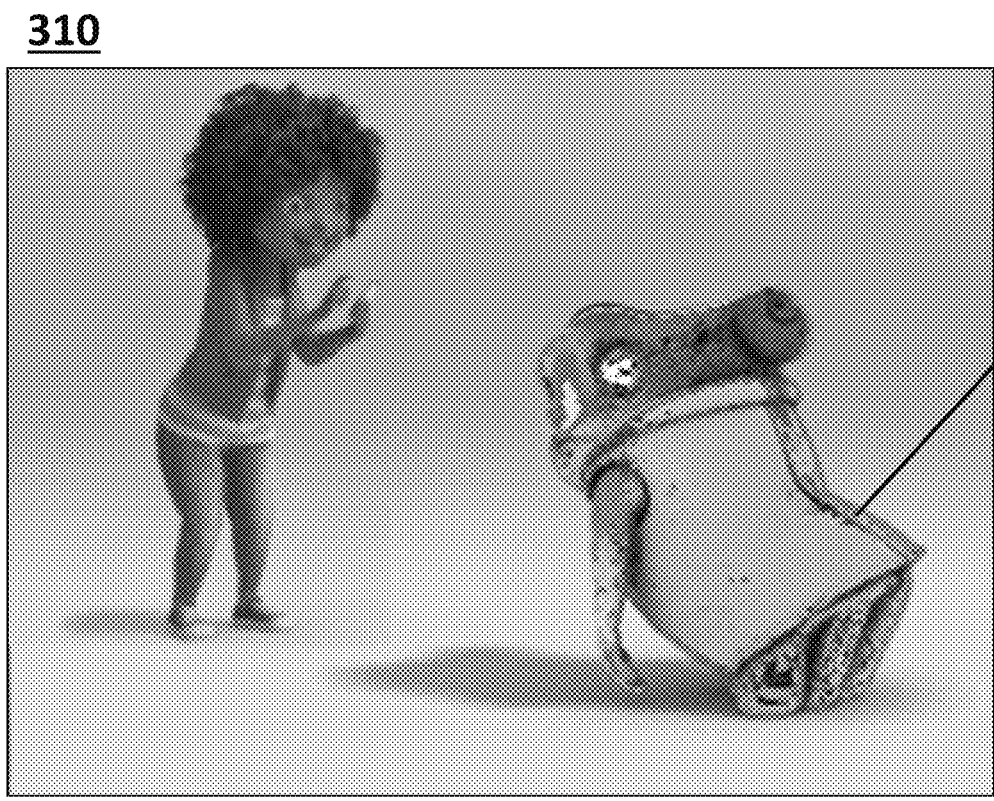
FIG. 3B depicts another exemplary image of the revised digital content in accordance with some embodiments.

The edited design template 210 can be used to modify the appearance of fictional character 110 in digital content 100. FIG. 3A illustrates an exemplary revised version of image 300 which is nearly the same as image 102 shown in FIG. 1 except that fictional character 110 is replaced with a revised fictional character 302. Revised fictional character 302 is a modified version of fictional character 110 that appears as provided in the edited design template 210. More particularly, revised fictional character 302 includes the colors and features added to the representation 202 in design template 200. Revised fictional character 302 can be used throughout digital content 100. FIG. 3B shows another exemplary image 310 in the computer-generated animation of digital content 100 in which revised fictional character 302 is displayed from a different perspective while maintaining an appearance in accordance with the edited design template 210.

The techniques described above may be used to create user generated content based on pre-existing content. For example, a user may edit a design template, which is then used to modify portions of existing content, such as a movie. In this way, a consumer may, for example, re-color or add graphical features to a movie character and then watch the movie with the character as he or she designed. This technique may be applied to various portions of a movie. For example, with a different template, a consumer could potentially customize the hair color of girl 106, the color and pattern of the markings on animal 108, the color of background 104, features of a house in which fictional character 110 lives in the movie (not shown), or any other portion of digital content 100 represented on the template. These techniques may therefore allow a user to create a customized version of a movie in order to increase the entertainment value to the user.

Figure 4:
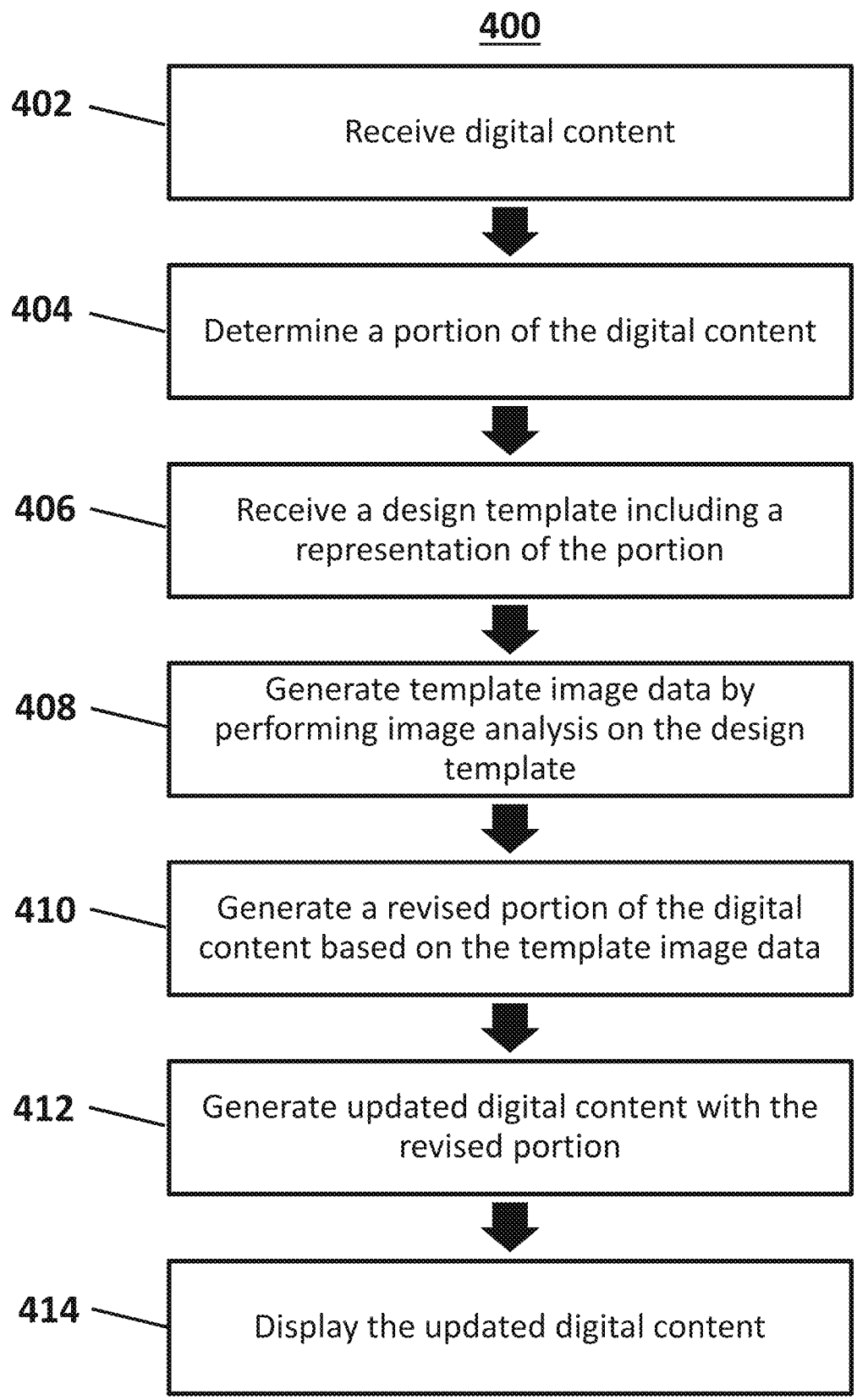
FIG. 4 depicts a flow diagram of an exemplary process for generating user-customized content in accordance with some embodiments.

Turning now to FIG. 4, additional embodiments and optional features of the techniques described above are discussed with reference to exemplary process 400. FIG. 4 depicts a flow diagram illustrating process 400 for modifying digital content. In some embodiments, portions of process 400 are performed on one or more computing system, such as computing system 600 described below with reference to FIG. 6. Portions of process 400 may be performed on a computing system local to a user. Some portions of process 400 may be provided as a service by a remote computing system (e.g., a server over the Internet). Some operations in process 400 may be combined, the order of some operations may be changed, and some operations may be omitted.

At block 402, digital content (e.g., digital content 100) is received. In some embodiments, digital content includes one or more image, a video, a movie, a computer-generated environment, background, or scene, a computer-generated animation asset (e.g., a character, object, or portion thereof), a computer-generated image, a computer-generated animation, two-dimensional imagery, three-dimensional imagery, or a combination or portion thereof. In some embodiments, the digital content is received from memory of a local computing system (e.g., a smartphone, tablet, or computer) or from a remote computing system (e.g., a server accessed over the Internet).

At block 404, a portion of the digital content is determined (e.g., fictional character 110). The determined portion may be referred to as a modifiable portion. In some embodiments, the portion includes a designated area of an image (e.g., the border around the edges of an image), a general area in the image (e.g., a background or surface, such as a lake or a grass field), or an area of an image occupied by a particular object, character, person, or the like. For digital content comprised of multiple images, the location occupied by the modifiable portion may be the same in each image or change from image to image (e.g., the modifiable portion may move as an object moves in a video). In the context of computer-generated animation, the modifiable portion can include, for example, a computer-generated animation asset (e.g., a character, object, or portion thereof), a computer-generated environment, background, or scene, or an area, object, or character in a computer-generated image or animation. One or more frames of a movie, video, computer-generated animation, or the like may include at least part of the modifiable portion. In some embodiments, more than one portion of the content is determined to be part of the modifiable portion.

At block 406, a design template (e.g., design template 200) is received. The design template includes a representation (e.g., representation 202) of the modifiable portion. In some embodiments, the design template is received from local memory or a remote device. Optionally, the design template includes more than one representation, where each representation represents a different modifiable portion of the digital content or a different part of a modifiable portion.

In some embodiments, design template 200 is a physical template, such as a piece of paper, that can be edited using, for example, pencil, marker, crayons, or the like. Optionally, the edited template is scanned, converted to a digital image, and sent to and received by a computing system. In some embodiments, the physical template is scanned with a scanning machine or by taking a digital photograph of the template (e.g., with a smartphone). As shown in FIGS. 2A-2B, the design template may include a quick response (QR) code 206 or other indication that can be used to determine the particular digital content or modifiable portion(s) associated with the design template.

In some embodiments, design template 200 is an electronic template. The electronic template may be displayed for digital editing on an electronic display (e.g., a television, computer monitor, touch-screen, or the like). Optionally, a design template is displayed in a graphical user interface of a computer application that provides template editing capabilities. In some embodiments, the application is run on a desktop or laptop computer, tablet, smartphone, or other electronic device, which may access the design template either locally or from a remote computing system. In some embodiments, the template is edited in accordance with user inputs detected on the graphical user interface. For example, a user may perform inputs to edit the template. Data representing the user input may be received and then the design template may be modified in accordance with the user input.

At block 408, template image data is generated by performing image analysis on the design template, including the representation of the modifiable portion. The image analysis may include image processing to determine the color content and/or spatial characteristics of the design template. The template image data may include a color profile of the representation in the template. In some embodiments, a color profile is determined by sampling the design template at various locations and determining a color value for each sample point. The color profile of the representation may therefore comprise color values associated with locations on the design template (e.g., locations occupied by the representation of the modifiable portion).

Optionally, the image analysis includes determining the digital content or modifiable portion associated with the design template. This determination may be based on the results of image processing to recognize the representation or analysis of a quick response (QR) code 206 or other identifying information on the design template.

At block 410, a revised version of the modifiable portion of the digital content is generated based on the template image data generated from the design template at block 408. Hence, the revised portion is based on the characteristics of the received design template.

In some embodiments, a color profile of the revised version is determined based on the color profile of the representation in the design template. Generating the revised portion may include, for example, mapping the color values of the template image data onto corresponding points of the modifiable portion. The color values of a point on the representation of the modifiable portion may be mapped onto the corresponding location of the actual modifiable portion. A color value at points on the revised portion for which a corresponding sample point on the design template does not exist may be interpolated or extrapolated. The extent of extrapolation used may depend on the amount of the modifiable portion that is (or is not) represented on the design template. In cases such as the one illustrated in FIGS. 2A, 2B, 3A, and 3B, for example, substantial parts of the modifiable portion are not represented on the design template (e.g., FIG. 3B shows the back of fictional character 110, whereas representation 202 includes primarily a front view).

In some embodiments, the template image data is mapped onto a two-dimensional coordinate system for each image or frame of digital content. That is, for each frame, the visible part of the modifiable portion (e.g., the visible part of fictional character 110) is determined, and the color values corresponding to only the visible parts are mapped onto the plane.

In some embodiments, the template data is mapped onto a three-dimensional model of a computer-generated asset. Color values may be determined for an entire surface of the model, which can then be used to render images of the revised (e.g., re-colored) computer-generated asset.

In some embodiments, generating the revised version of the modifiable portion also includes determining texture and/or shading for the revised version of the modifiable portion. Texture and/or shading can be determined and added using various known techniques after the modifiable portion has been colored in accordance with the design template. In some embodiments, texture and shading information from the original modifiable portion is applied to the re-colored version. Re-using texture and shading data may have the benefit of reducing the computational resources and time required to generate the revised version.

It should also be recognized that at least some of the color values mapped from the design template to the modifiable portion may be removed, enhanced, shifted, or otherwise altered for aesthetic or other reasons.

At block 412, an updated version (e.g., image 300) of the digital content is generated. The updated digital content includes the revised modifiable portion (e.g., revised fictional character 302).

In some embodiments, generating the updated digital content includes mapping the revised portion onto the modifiable portion of the initial digital content.

Figure 5:
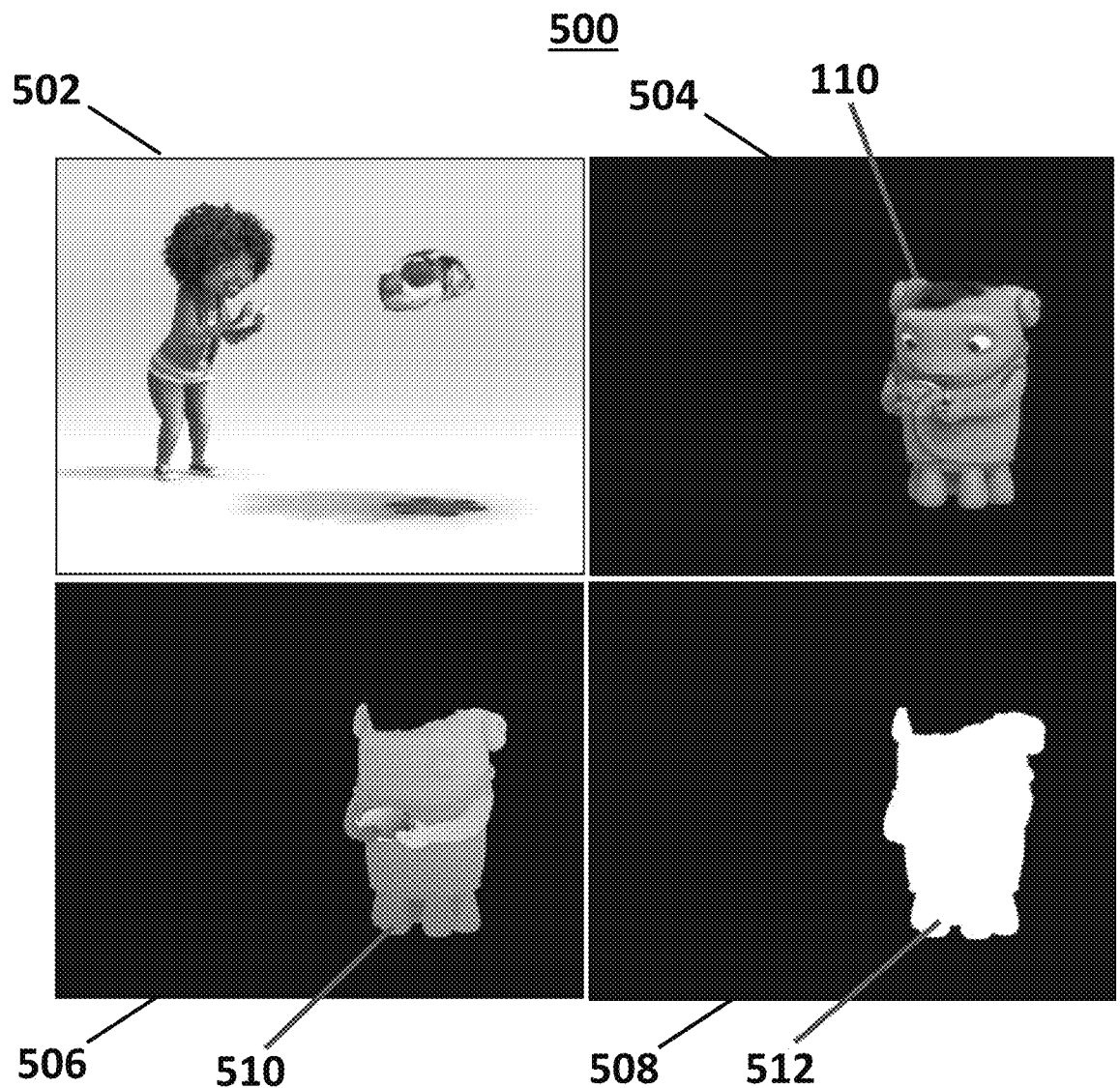
FIG. 5 depicts an exemplary composite image for generating user-customized content in accordance with some embodiments.

In some embodiments, generating the updated digital content includes generating a composite image such as the one shown in FIG. 5, which illustrates exemplary image 500 with sub-images 502, 504, 506, and 508. Image 500 is rendered using the data (e.g., computer-generated animation assets, models, lighting, color, textures, etc.) underlying the computer-generated image 102 and the modifiable portion determined at block 404.

Sub-image 502 includes all of the digital content 100 included in image 102 except modifiable portion 110. In the absence of modifiable portion 110, sub-image 502 includes portions of digital content 100 that are not visible in image 102, such as, for example, the shadows underneath the feet of fictional character 110 and the portion of the background behind fictional character 110. Sub-image 504 includes only the original version of the modifiable portion 110 (e.g., the parts of fictional character 110 that are visible in image 102). In some embodiments, sub-image 504 is generated merely to preserve the original version of the modifiable portion 110. Sub-image 506 includes a representation 510 that includes texture and shading data for the revised modifiable portion (e.g., revised fictional character 302). In some embodiments, sub-image 506 includes texture and shading information from the original modifiable portion 110. Sub-image 508 is a binary image indicating the position of the modifiable portion. The area 512 occupied by the modifiable portion is white, while the rest of the image is black, where black indicates no content.

In some embodiments, the updated digital content is generated by mapping the color values of the revised modifiable portion onto the occupied area 512 in sub-image 508. The texture and shading from sub-image 506 can then be applied to area 512 in sub-image 208. Notably, in this embodiment, texturing and shading is performed as part of block 412 instead of block 410 as described above. After the shading and texture are applied, sub-image 508 (which now includes the colored, textured, and shaded revised version of the modified portion) is overlaid or applied on top of sub-image 502, resulting in image 300 shown in FIG. 3A.

Although image 500 is described here with reference to block 412, it should be recognized that image 500 can be generated at any time after the modifiable portion is determined (e.g., as part of block 404). Also, it should be recognized that sub-images 502, 504, 506, and 508 may be treated (e.g., stored, accessed, or processed) as stand-alone images without affecting the ability to perform the techniques described above.

In some embodiments, instead of mapping the revised version onto sub-image 508 and adding the texture and shading from sub-image 506 as described above, an image of the revised modifiable portion can be rendered. This may be possible for embodiments in which the template image data has been mapped onto a three-dimensional model of a computer-generated asset. The rendered image of the revised modifiable portion can then be applied on top of sub-image 502, resulting again in image 300 shown in FIG. 3A. In yet another embodiment, the entire image 300 can be re-rendered along with the revised modifiable portion. Rendering (or re-rendering) the revised portion or the entire image may require additional time and/or computational resources, but may also provide higher quality imagery (e.g., higher resolution).

At block 414, the updated version of the digital content is displayed. In some embodiments, the updated digital content is displayed on a local display of a local device. In some embodiments, the updated digital content is transmitted to a remote device for display (e.g., as an image file, video file, multimedia file, or via streaming video).

Figure 6:
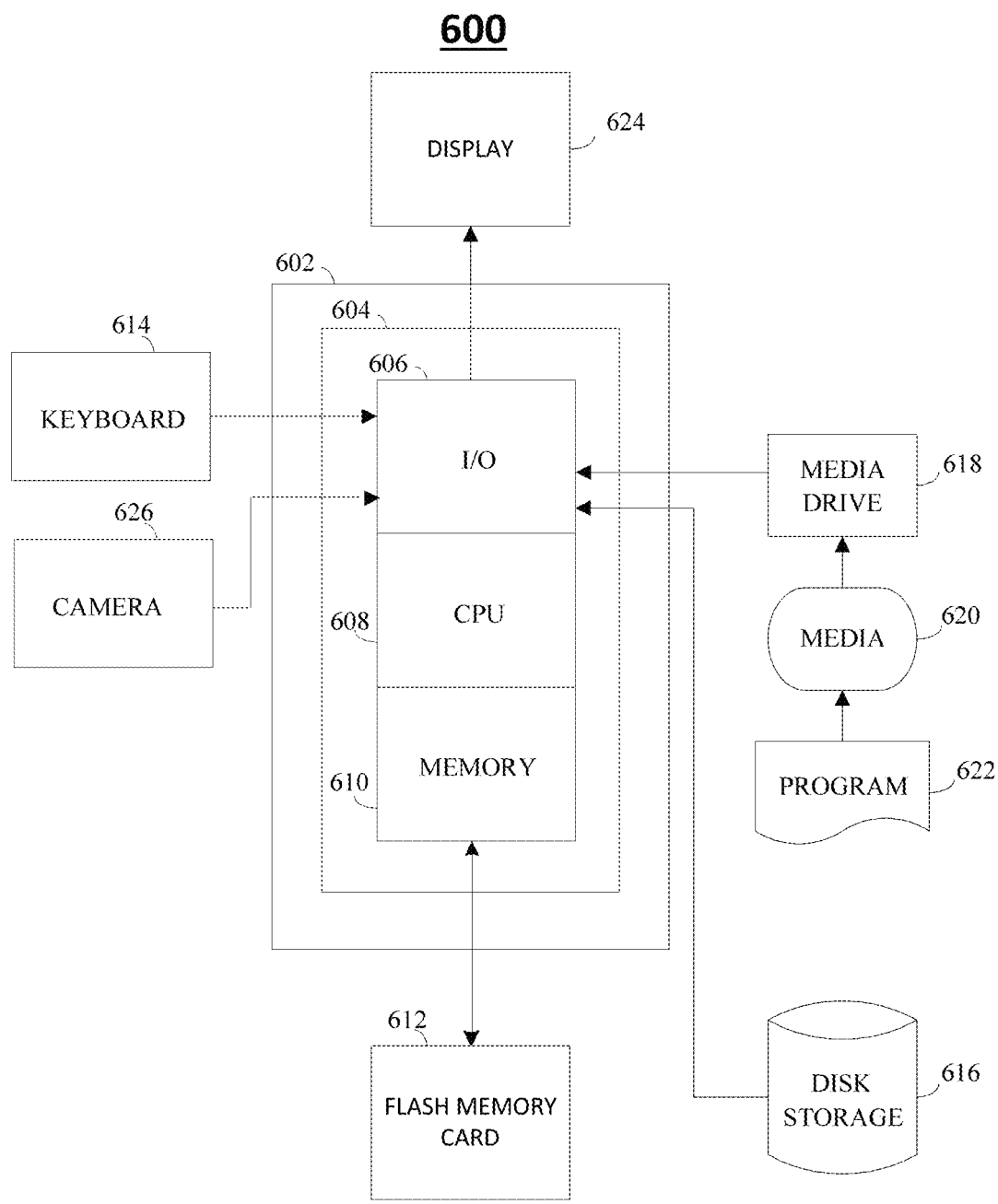
FIG. 6 depicts an exemplary computing system in accordance with some embodiments.

FIG. 6 depicts components of an exemplary computing system 600 configured to perform any one of the above-described processes. In some embodiments, computing system 600 is a desktop computer, tablet computer, smartphone, server, media player (e.g., DVD player), video game console, or the like. Computing system 600 may include, for example, a processing unit including one or more processors, a memory, a storage, and input/output devices (e.g., monitor, touch screen, keyboard, camera, stylus, drawing device, disk drive, USB, Internet connection, near-field wireless communication, Bluetooth, etc.). However, computing system 600 may include circuitry or other specialized hardware for carrying out some or all aspects of the processes (e.g., process 400). In some operational settings, computing system 600 may be configured as a system that includes one or more units, each of which is configured to carry out some aspects of the processes in software, hardware, firmware, or some combination thereof.

In computing system 600, the main system 602 may include a motherboard 604 with a bus that connects an input/output ("I/O") section 606, one or more central processing unit ("CPU") 608, and a memory section 610, which may have a flash memory card 612 related to it. Memory section 610 may contain computer-executable instructions and/or data for carrying out at least portions of process 400. The I/O section 606 is optionally connected to display 624, a camera 626, a keyboard 614, a disk storage unit 616, or a media drive unit 618. The media drive unit 618 can read/write to non-transitory, computer-readable storage medium 620, which can contain programs 622 and/or data.

At least some values based on the results of the above-described processes can be saved for subsequent use. Additionally, a non-transitory, computer-readable storage medium can be used to store (e.g., tangibly embody) one or more computer programs for performing any one of the above-described processes by means of a computer. The computer program may be written, for example, in a general-purpose programming language (e.g., Pascal, C, C++, Java, or the like) or some specialized application-specific language.

The foregoing descriptions of specific embodiments have been presented for purposes of illustration and description. They are not intended to be exhaustive or to limit the scope of the claims to the precise forms disclosed, and it should be understood that many modifications and variations are possible in light of the above teaching.

We claim:

1. A method for generating a user-customized computer-generated animation, the method comprising:
    receiving digital content including a rendered video of a computer-generated animation;
    determining a modifiable portion of the digital content, wherein the digital content includes texture and shading data of the modifiable portion;
    receiving a design template, wherein the design template includes a representation of the modifiable portion of the digital content;
    generating template image data by performing image analysis on the representation of the modifiable portion of the digital content, wherein generating the template image data includes determining a color profile of the representation of the modifiable portion of the digital content;
    generating a revised portion of the digital content, wherein the revised portion is an altered portion of the modifiable portion of the digital content, and wherein the revised portion of the digital content includes a set of points, wherein each point in the set of points is generated based on the texture and shading data of the modifiable portion from the received digital content and the color profile of the representation of the modifiable portion of the digital content determined from the image analysis performed on the representation of the modifiable portion of the digital content from the design template;
    generating an updated version of the video of the computer-generated animation, wherein the updated video comprises a version of the computer-generated animation including the revised portion of the digital content; and
    causing a display of the updated video.

2. The method of claim 1, further comprising:
    before receiving the design template, providing the design template for editing,
    wherein the received design template is an edited version of the provided design template.

3. The method of claim 2,
    wherein providing the design template comprises providing a user interface including the design template, and
    wherein the method further comprises:
        receiving data representing a user input on the user interface; and
        editing the design template in accordance with the user input.

4. The method of claim 1, wherein generating the revised portion of the digital content comprises determining a color profile of the revised portion based on the color profile of the representation of the modifiable portion.

5. The method of claim 1, wherein generating the revised portion of the digital content comprises rendering the revised portion based on the color profile of the representation of the modifiable portion of the digital content.

6. The method of claim 1, wherein generating the updated version of the video of the computer-generated animation comprises mapping the revised version onto the modifiable portion of the digital content.

7. The method of claim 1, wherein generating the updated version of the video of the computer-generated animation comprises rendering the digital content using the revised portion.

8. The method of claim 1, further comprising:
generating a version of the digital content without the modifiable portion,
wherein generating the updated version of the video of the computer-generated animation includes overlaying the revised portion on the version of the digital content without the modifiable portion.

9. The method of claim 1, wherein generating the revised portion of the digital content includes extrapolating color values onto points on the revised portion that are not represented on the design template.

10. A system for generating a user-customized computer-generated animation, the system comprising:
a processing unit and memory, wherein the processing unit is configured to:
receive digital content including a rendered video of a computer-generated animation;
determine a modifiable portion of the digital content, wherein the digital content includes texture and shading data of the modifiable portion;
receive a design template, wherein the design template includes a representation of the modifiable portion of the digital content;
generate template image data by performing image analysis on the representation of the modifiable portion of the digital content, wherein generating the template image data includes determining a color profile of the representation of the modifiable portion of the digital content;
generate a revised portion of the digital content, wherein the revised portion is an altered portion of the modifiable portion of the digital content, and wherein the revised portion of the digital content includes a set of points, wherein each point in the set of points is generated based on the texture and shading data of the modifiable portion from the received digital content and the color profile of the representation of the modifiable portion of the digital content determined from the image analysis performed on the representation of the modifiable portion of the digital content from the design template;
generate an updated version of the video of the computer-generated animation, wherein the updated video comprises a version of the computer-generated animation including the revised portion of the digital content; and
cause a display of the updated video.

11. The system of claim 10, wherein the processing unit is further configured to:
before receiving the design template, provide the design template for editing,
wherein the design template received by the processing unit is an edited version of the provided design template.

12. The system of claim 11,
wherein providing the design template comprises providing a user interface including the design template, and wherein the processing unit is further configured to:
receive data representing a user input on the user interface; and
edit the design template in accordance with the user input.

13. The system of claim 10, wherein generating the revised portion of the digital content comprises determining a color profile of the revised portion based on the color profile of the representation of the modifiable portion.

14. The system of claim 10, wherein generating the revised portion of the digital content comprises rendering the revised portion based on the color profile of the representation of the modifiable portion of the digital content.

15. The system of claim 10, wherein generating the updated version of the video of the computer-generated animation comprises mapping the revised version onto the modifiable portion of the digital content.

16. The system of claim 10, wherein generating the updated version of the video of the computer-generated animation comprises rendering the digital content using the revised portion.

17. The system of claim 10, wherein the processing unit is further configured to:
generate a version of the digital content without the modifiable portion,
wherein generating the updated version of the video of the computer-generated animation includes overlaying the revised portion on the version of the digital content without the modifiable portion.

18. A non-transitory computer-readable storage medium comprising computer-executable instructions for generating a user-customized computer-generated animation, the computer-executable instructions comprising instructions for:
receiving digital content including a rendered video of a computer-generated animation;
determining a modifiable portion of the digital content, wherein the digital content includes texture and shading data of the modifiable portion;
receiving a design template, wherein the design template includes a representation of the modifiable portion of the digital content;
generating template image data by performing image analysis on the representation of the modifiable portion of the digital content, wherein generating the template image data includes determining a color profile of the representation of the modifiable portion of the digital content;
generating a revised portion of the digital content, wherein the revised portion is an altered portion of the modifiable portion of the digital content, and wherein the revised portion of the digital content includes a set of points, wherein each point in the set of points is generated based on the texture and shading data of the modifiable portion from the received digital content and the color profile of the representation of the modifiable portion of the digital content determined from the image analysis performed on the representation of the modifiable portion of the digital content from the design template;
generating an updated version of the video of the computer-generated animation, wherein the updated video comprises a version of the computer-generated animation including the revised portion of the digital content; and
causing a display of the updated video.

19. The computer-readable storage medium of claim 18, further comprising instructions for:
before receiving the design template, providing the design template for editing, wherein the received design template is an edited version of the provided design template.

20. The computer-readable storage medium of claim 19, wherein providing the design template comprises providing a user interface including the design template, and wherein the computer-readable storage medium further comprises instructions for:

receiving data representing a user input on the user interface; and editing the design template in accordance with the user input.

21. The computer-readable storage medium of claim 18, wherein generating the revised portion of the digital content comprises determining a color profile of the revised portion based on the color profile of the representation of the modifiable portion.

22. The computer-readable storage medium of claim 18, wherein generating the revised portion of the digital content comprises rendering the revised portion based on the color profile of the representation of the modifiable portion of the digital content.

23. The computer-readable storage medium of claim 18, wherein generating the updated version of the video of the computer-generated animation comprises mapping the revised version onto the modifiable portion of the digital content.

24. The computer-readable storage medium of claim 18, wherein generating the updated version of the video of the computer-generated animation comprises rendering the digital content using the revised portion.

25. The computer-readable storage medium of claim 18, further comprising instructions for:

generating a version of the digital content without the modifiable portion, wherein generating the updated version of the video of the computer-generated animation includes overlaying the revised portion on the version of the digital content without the modifiable portion.

* * * * *